INVENTOR.
Glenn T. McClure
BY Joseph Januszkiewicz
Attorney

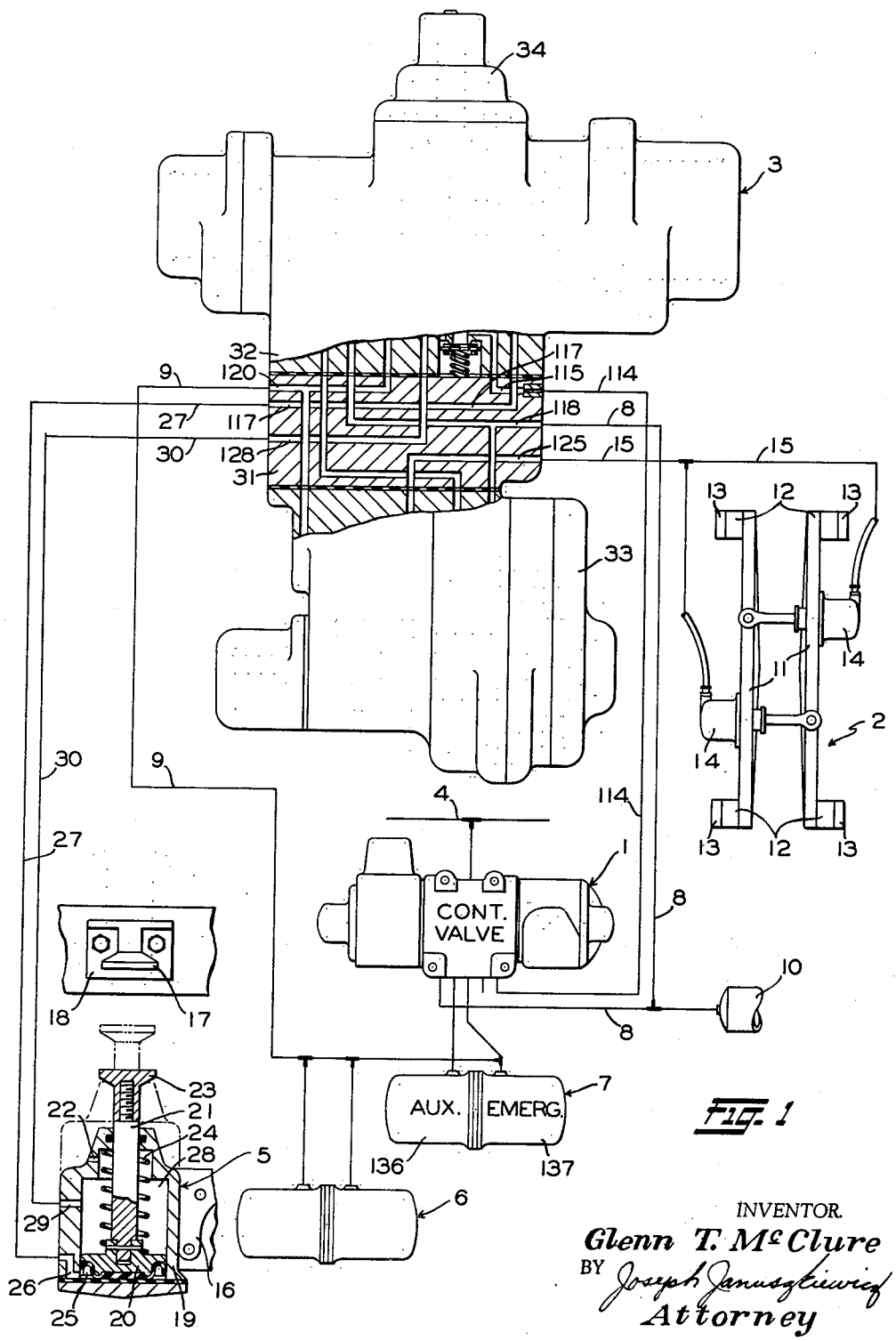

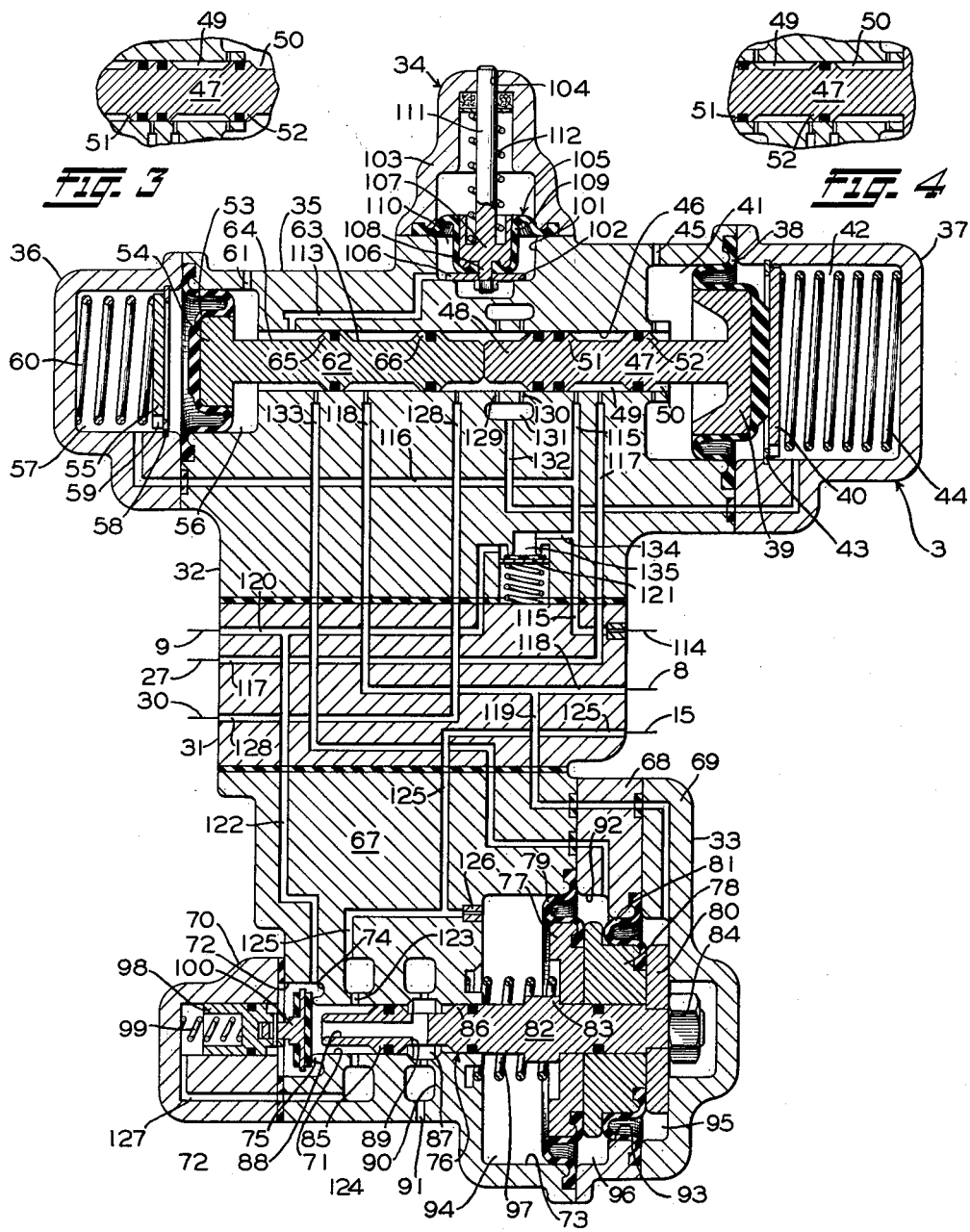

United States Patent Office 3,136,588
Patented June 9, 1964

3,136,588
FLUID PRESSURE BRAKE CONTROL APPARATUS WITH EMPTY AND LOAD CHANGEOVER
Glenn T. McClure, McKeesport, Pa., assignor to Westinghouse Air Brake Company, Wilmerding, Pa., a corporation of Pennsylvania
Filed Dec. 10, 1962, Ser. No. 243,247
13 Claims. (Cl. 303—23)

This invention relates to fluid pressure brake apparatus for railway vehicles and more particularly to load-controlled fluid pressure brake apparatus.

In the design of brake systems for railway vehicles, it is well understood that it is desirable to provide means for varying the braking force in accordance with the empty or loaded condition of a railway vehicle to accommodate the degree of braking to the amount of loading and avoid excessive braking under empty car conditions. Various apparatus has heretofore been proposed and employed, however, such apparatus has been intricate and complex requiring at times complete renovation or change in equipment which became too costly.

More recently, consideration has been given to utilization of empty and load type of control apparatus for braking systems because of the increased use of lightweight materials in the construction of railway cars and the increase in length of railway cars, making the difference in weight between a fully loaded railway car and an empty car materially greater. It is, therefore, desirable to provide a simple and economical load-responsive braking apparatus operative to avoid wheel sliding and excessive train shock on loaded as well as empty cars.

It is an object of this invention to provide a simple, economical, new and improved load-responsive changeover valve device requiring little maintenance, which is adaptable to existing brake equipment including the so-called compensating type brake cylinder as well as a conventional brake cylinder for controlling the empty and load brake operation on railway cars.

In accordance with this invention, the change-over valve device comprises a casing containing a differential piston in the form of coaxal spaced diaphragms of different size, wherein the diaphragms cooperate with the casing to define three adjoining chambers, i.e., an intermediate chamber and two outer chambers, such that the differential piston is adapted to actuate a valve member cooperative with a valve seat. A load-measuring device is operatively connected to the change-over valve device to connect, under the empty condition of a railway car, a controlled actuating pressure fluid to one of the outer chambers defined by the smaller diaphragms such that the valve member is actuated to direct the controlled actuating pressure fluid into the brake cylinders for a brake application while simultaneously directing a portion of such fluid through a choke into the other outer chamber as defined by the larger diaphragm to balance the differential piston and seat the valve member, whereby the brakes are applied with a pressurized fluid that is proportionally less than the actuating pressure fluid. Under a loaded car condition, the load measuring device conditions the change-over valve device to connect the outer chamber defined by the smaller diaphragm as well as the intermediate chamber to the controlled actuating pressure fluid to unseat the valve member, whereby pressure fluid is directed to the brake cylinder and the other outer chamber to balance the differential piston and to actuate the brakes with pressurized fluid that is equal to the pressure of the controlled actuating fluid.

In the accompanying drawings:

FIG. 1 is a diagrammatic view, partly in section, showing a railway car brake equipment which includes a novel brake control apparatus for automatically controlling brake pressure according to the loaded or empty condition of a railway car.

FIG. 2 is a cross-sectional view, at an enlarged scale and partly in section, of a change-over valve device illustratively positioned in its neutral zone.

FIG. 3 is a cross-sectional view of a portion of the change-over valve device showing the relationship of a portion of the valve stem and ports in an empty condition of a railway car.

FIG. 4 is a cross-sectional view of a portion of the change-over valve device showing the relationship of a portion of the valve stem and ports in a loaded condition of a railway car.

Figure 5:
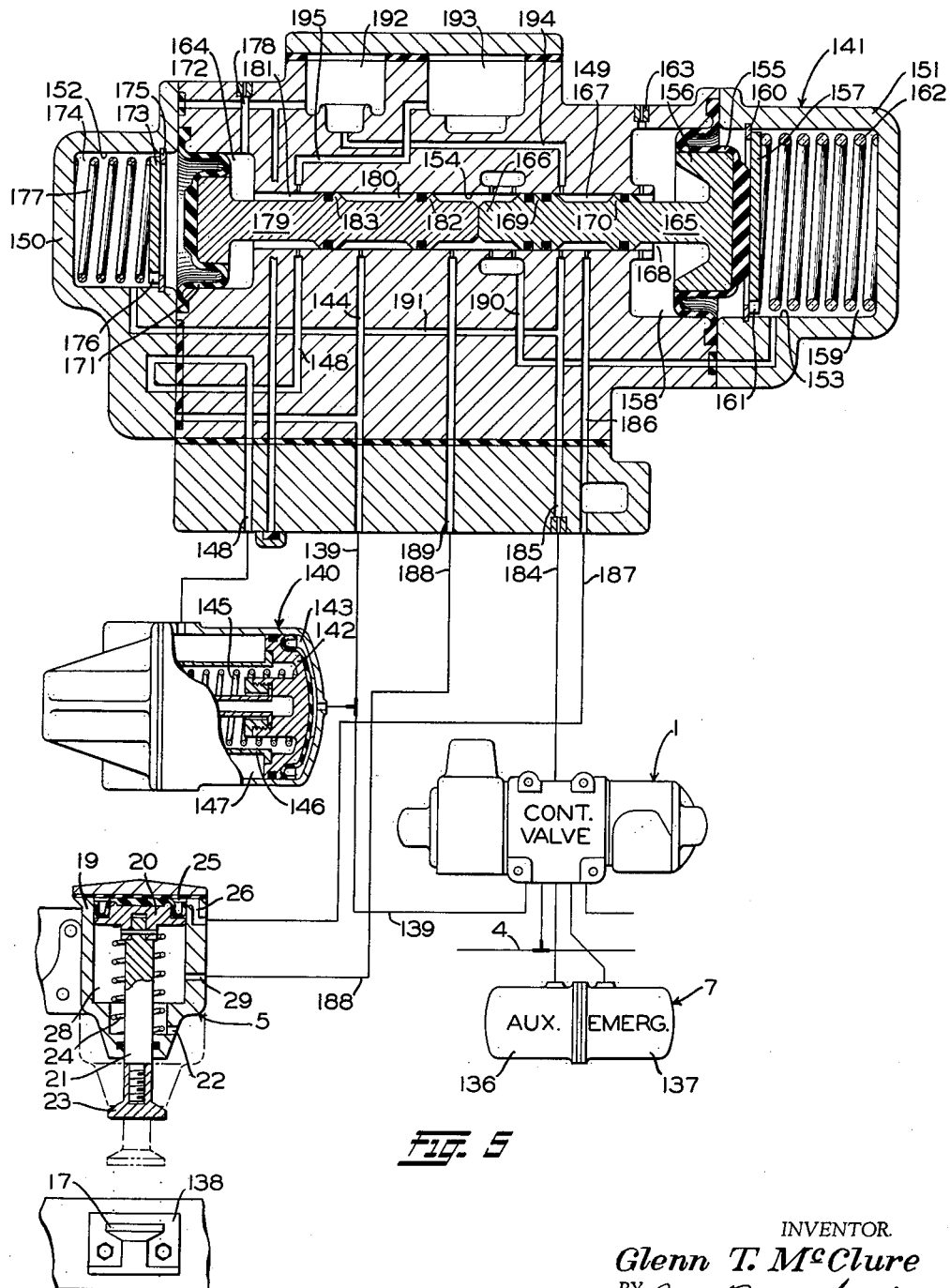
FIG. 5 is a diagrammatic view, partly in section, showing a railway car brake equipment which includes a cross-sectional view of a modified form of change-over valve for controlling braking pressure according to the empty or loaded condition of a railway car.

As shown in FIG. 1 of the drawings, the fluid pressure brake equipment comprises an AB type brake control valve 1, brake means or brake rigging 2, a load change-over valve device 3, brake pipe 4, load measuring device 5, and air supply reservoirs 6 and 7.

The AB control valve 1 is of the usual well-known type which responds to the charging of the brake pipe 4 to charge the air reservoirs 6 and 7 in the manner well known and understood in the art, and which responds to a reduction in pressure in brake pipe 4 to direct pressurized fluid via a supply pipe 8 to the load change-over valve device 3. A conduit 9 has branch conduits interconnecting the air supply reservoir 6, the emergency reservoir portion of air reservoir 7, the AB valve 1 and a passageway in the change-over valve device 3. A displacement volume reservoir 10 is interconnected into supply pipe 8.

The brake rigging 2 comprises a pair of brake beams 11 that normally extend crosswise of the railway car in parallel spaced relationship to each other. The brake beams 11 are adapted to be movably supported at each end on the side frame members of a car truck in a manner well understood in the art (refer to U.S. Patent 2,958,398. Supported adjacent the outer ends of each brake beam 11 are brake heads 12 which carry brake shoes 13 respectively for contact with the tread of an associated wheel. Each brake beam 11 has suitably rigidly secured thereto a brake cylinder 14 in which is reciprocably mounted a piston whose rod is secured to the oppositely disposed brake beam 11 such that pressurization of the respective cylinder ends of each brake cylinder 14 causes the respective brake shoes 13 to contact the associated adjacent wheels for a braking application in a manner well understood in the art. Pressurized fluid is supplied to the respective brake cylinders 14 via a conduit 15 connected to a passageway in the change-over valve 3.

The load measuring device 5 is mounted on a suitable sprung portion of the railway car, such as the car truck bolster, by a bracket 16 substantially in line with a stop member 17 formed on a bracket 18 suitably attached to an unsprung part of the car truck, such as the side frame of the car truck, for intermittent engagement thereby, under circumstances hereinafter to be described.

The load measuring device 5 comprises a vertically disposed cylindrical strut cylinder 19 of well-known type, in which cylinder 19 is slidably mounted a control piston 20 having a piston rod 21 extending through and slidably guided in the non-pressure head at the upper end portion thereof. The upper end portion of cylinder 19 is vented to atmosphere via a port 22. The upper end of the piston rod 21 has a stop member 23 suitably adjustably mounted thereon. A spring 24, encompassing the piston rod 21, has its upper end portion seated on the upper end inner wall portion of strut cylinder 19 and its lower end portion engaging the piston 20, whereby the spring 24 urges the piston 20 to its lowermost position in the strut cylinder 19. A presure chamber 25 at the lower end portion of the strut cylinder 19 defined by the piston 20 and the lowermost end portion of the cylinder 19 is connected via a passageway 26 to a conduit 27. A non-pressure chamber 28 at the upper end portion of the strut cylinder 19 defined by the piston 20 and the upper end portion of the cylinder 19 is connected via a passageway 29 to a conduit 30. With the railway car loaded, the stop member 17 is a greater distance from the stop member 23 than when the railway car is empty since the stop member 23 is on the sprung portion of the railway car and the springs supporting the sprung portion are compressed in accordance with the degree of loading on the sprung portion which, in the case of a loaded condition of a railway car, would be relatively greater than under an unloaded condition of a railway car.

When the railway car is loaded, the position of the strut cylinder 19 relative to the bracket 18 on the unsprung portion of the car truck is such as is shown in full lines in FIG. 1, wherein the stop member 23 on the movable piston rod 21 is adapted to move into abutting engagement with the stop member 17 upon pressurization of chamber 25 via conduit 27. Such pressurization of chamber 25 moves piston 20 upwardly as viewed in FIG. 1 to connect passageway 26 with passageway 29 and conduit 30. When the railway car is empty, the strut cylinder 19, relative to the unsprung portion 18 of the car, assumes a position such that the stop member 23 will be relatively close to stop member 17 since the car springs are not compressed as much as when the car is loaded, such that upon pressurization of chamber 25 via conduit 27, piston 20 will move upwardly in strut cylinder 19 only a limited amount due to engagement of stop member 17 by stop member 23. In this position of piston 20, passageway 29 will not be uncovered and communication will be blocked between passageways 26 and 29.

The load change-over valve 3 comprises a housing having a pipe bracket portion 31, a change-over valve portion 32, relay valve portion 33 and a load indicator 34.

The change-over valve portion 32 (FIG. 2) comprises a sectionalized casing having a central body portion 35 and cup-shaped end sections 36, 37, wherein the end sections 36 and 37 are suitably secured to the respective ends of the central body section 35. A movable diaphragm 38 having its outer peripheral edge clamped between the one end section 37 and the central body section 35, a recessed central portion of the diaphragm receiving and being suitably secured to a piston follower or head 39 located in the one end of central body section 35 adjacent end section 37. A circular follower disc 40 located in end section 37 abuttingly engages the outer face of diaphragm 38. Diaphragm 38 cooperates with the central body portion 35 to define a chamber 41 therein, and cooperates with the end section 37 to define a chamber 42. The end section 37 closely adjacent the central body portion 35 is internally annularly recessed to receive an annular stop ring 43 which limits the movement of follower disc 40 toward the central body portion 35. A spring 44 located in chamber 42 has one end seated on the closed end portion of cup-shaped end section 37 and its other end abuttingly engaging follower disc 40, thereby biasing follower disc 40 into engagement with the stop ring 43 and diaphragm 38. Follower disc 40 is suitably recessed or grooved at its outer periphery to maintain fluid communication between all portions of chamber 42 such as when disc 40 engages stop ring 43. The central body section 35 has a port 45 connecting chamber 41 with atmosphere for maintaining chamber 41 at atmospheric pressure at all times. The central body section 35 has a bore 46 extending longitudinally therethrough connecting chamber 41 on one end thereof with a chamber on the other end. Reciprocably mounted in the bore 46 of body portion 35 is a stem 47 of piston head 39, which stem 47 has a reduced end portion 48 and a pair of spaced grooves 49 and 50 defining a pair of spaced lands 51 and 52 which slidingly and sealingly contact the inner wall surface of bore 46.

A movable diaphragm 53 suitably located between the cup-shaped end section 36 and the central body portion 35 has its peripheral edge clamped between the central body portion 35 and the end section 36. A piston head 54 located in the other end of central body portion 35 adjacent end section 36 is suitably received in the inner recessed face of diaphragm 53 and secured thereto for movement therewith. A circular flat follower disc 55 located in end section 36 is adapted to abuttingly engage the outer face of diaphragm 53. Diaphragm 53 cooperates with the central body portion 35 to define a chamber 56, and cooperates with the other end section 36 to define a chamber 57. The end section 36 closely adjacent the central body portion 35 is internally annularly recessed to receive an annular stop ring 58 which limits the movement of follower disc 55 towards the central body portion 35. Follower disc 55 is recessed at its outer periphery as at 59 to maintain fluid communication between all portions of chamber 57, such as when disc 55 abuttingly engages stop ring 58. A spring 60 located in chamber 57 has one end seated on the closed end portion of the cup-shaped end section 36 and its other end abuttingly engaging follower disc 55 for biasing follower disc 55 into engagement with the stop ring 58. The central body portion 35 has a port 61 connecting chamber 56 with atmosphere, for maintaining chamber 56 at atmospheric pressure at all times. The piston head 54 has a stem 62 extending into the bore 46 of the central body portion 35 with its reduced end portion abuttingly engaging the reduced end portion 48 of stem 47. Stem 62 has a pair of spaced grooves 63 and 64 defining a pair of spaced lands 65 and 66 which slidingly and sealingly contact the inner wall surface of bore 46.

The relay valve portion 33 comprises a casing having a main body portion 67 with a tubular portion 68 and a cap member 69 secured to one end thereof and a cap member 70 secured to the other end thereof. Extending centrally through body portion 67 is a bore having an intermediately located reduced bore portion 71 and a pair of spaced enlarged end bore portions 72 and 73. The annular shoulder on main body portion 67 between enlarged end bore portion 72 and reduced bore portion 71 is annularly recessed as at 74 such as to present an annular sealing bead 75 at the one end of reduced bore portion 71.

A movable abutment, such as a diaphragm type piston 76, is suitably located within the reduced bore portion 71 and enlarged end bore portion 73 of the main body portion 67 and the bore of the tubular portion 68 as well as centrally apertured recess in cap member 69. Diaphragm piston 76 includes a centrally apertured follower disc 77 and a centrally apertured intermediate follower disc 78, which follower discs are secured together as hereinafter described to clamp the inner peripheral edge of an annular resilient diaphragm 79 therebetween with the outer peripheral edge of diaphragm 79 being clamped between the main body section 67 and the tubular portion 68. Diaphragm piston 76 additionally includes a centrally apertured follower disc 80 immediately adjacent intermediate follower disc 78, which follower discs clamp the inner peripheral edge of an annular resilient diaphragm 81 therebetween with the outer peripheral edge of diaphragm 81 being clamped between the tubular portion 68 and the cap member 69.

Extending through the centrally apertured follower discs 77, 78 and 80 for clamping engagement and for movement therewith is a stem 82, which stem 82 has a shoulder 83 abuttingly engaging disc 77 with a nut 84 threadedly engaged on the one end portion of stem 82 for clamping the discs 77, 78 and 80 onto stem 82. The other end portion of stem 82 has a pair of spaced land portions 85 and 86 defining a groove 87 therebetween and an outermost reduced end portion to provide a passageway between the reduced end portion and the inner wall surface of the reduced bore portion 71 of the main body portion 67 for the control of fluid. The land portions 85 and 86 slidingly and sealingly engage the inner wall surface of the reduced bore portion 71 of main body portion 67 for guiding the reciprocable movement of stem 82 in bore 71. The reduced outermost end portion of stem 82 has a bore 88 extending longitudinally therein communicating with a plurality of radially extending ports 89 that register with the groove 87 therein. Main body portion 67 has an annular chamber 90 communicating with the groove 87 via a series of ports and via a passageway 91 to atmosphere thereby venting the clearance space between the reduced outermost end portion of stem 82 and bore portion 71 via bore 88, ports 89, groove 87, chamber 90, and passageway 91 to atmosphere.

Tubular portion 68 has a forward bore portion 92 substantially the same diameter as enlarged bore portion 73 of the main body portion 67 and a rearwardly disposed bore portion 93 of smaller diameter than the forward bore portion 92.

Diaphragm 79 cooperates with bore 73 of the main body portion 67 to define a first outer chamber 94, while diaphragm 81 cooperates with the annular recess in cap member 69 as well as the reduced bore portion 93 of tubular member 68 to define a second outer chamber 95, such that the cross-sectional piston area of disc 80 and diaphragm 81 is less than the cross-sectional area of disc 77 and diaphragm 79 to present a differential area therebetween. An intermediate chamber 96 is defined by the diaphragms 79 and 81 and the tubular member 68. A helical spring 97 encompassing the intermediate portion of stem 82 has one end seated on the shoulder between reduced bore portion 71 and enlarged bore portion 73 in the main body portion 67 and its other end seated on the disc 77 for biasing diaphragm type piston 76 rightward as viewed in FIG. 1 until disc 80 abuttingly engages cap member 69.

Slidably received within the bore of the cap member 70 is a piston valve device 98, which valve device 98 has one end centrally recessed to provide a seat for a spring 99 and the other end connected to a flat valve 100, which valve 100 has an outer seated portion subject to brake cylinder pressure in a manner to be described and an inner seated portion within the sealing bead 75 subject to atmospheric pressure. Valve 100 is subject to being unseated by the movement of stem 82 to thereby interconnect the enlarged bore portion 72 with the reduced bore portion 71 to allow the passage of pressurized fluid therebetween. Spring 99 has its one end seated on the closed end of cap member 70 and its other end engaging piston valve device 98 for biasing the valve 100 into sealing engagement with sealing bead 75.

The upper end portion of change-over valve portion 32 has a recess 101 extending downwardly therein a short distance, which recess 101 has a bottom surface 102. Load indicator 34 comprises a cup-shaped casing 103 which has its open end portion substantially coextensive with the recess 101. The closed end portion of cup-shaped casing 103 has a bore 104 extending centrally therethrough having its central axis coincident with the axis of the open end portion of cup-shaped casing 103.

A movable abutment, such as diaphragm type piston 105, is suitably located between the casing 103 and the recess 101 in change-over valve portion 32. Diaphragm type piston 105 comprises a centrally apertured lower follower disc 106 seated on bottom surface 102, a piston 107 having a forward downwardly extending threaded stem portion 108 and a centrally apertured diaphragm 109. Diaphragm 109 has its inner peripheral edge clamped between the lower follower disc 106 and the piston 107 with its outer marginal edge clamped between the casing 103 and the upper end portion of changeover valve portion 32 closely adjacent recess 101. The threaded stem portion 108 of piston 107 suitably receives a nut which securely connects piston 107, diaphragm 109 and follower disc 106 together. A load indicating chamber 110 is defined by the diaphragm 109 and recess 101 of changeover valve portion 32. Piston 107 has an upwardly extending guide stem 111 which slidingly engages the bore 104 on the closed end portion of cup-shaped casing 103 for movement therethrough. A spring 112 encompassing the guide stem 111 has one end portion thereof seated on the closed end portion of cup-shaped casing 103 and its other end portion engaging the piston 107 for biasing the piston 107 into its lowermost position to seat lower follower disc 106 on the bottom surface 102 of recess 101. Pressurization of chamber 110 moves piston 105 upwardly along with its upwardly extending guide stem 111, which guide stem 111 projects upwardly through the bore 104 thereby visually indicating a loaded condition of the railway car, as will be more fully explained hereinafter; whereas, with chamber 110 vented to atmosphere, guide stem 111 is fully retracted within casing 103 through the biasing action of spring 112 thereby visually indicating an empty condition of a railway car. Chamber 110 is connected via a passageway 113 to that portion of bore 46 closely adjacent chamber 56 such that with the groove 64 registering with the opening into passageway 113, load indicating chamber 110 will be connected via passageway 113, groove 46, chamber 56 to port 61 to thereby vent load indicating chamber 110 to atmosphere.

Pipe bracket portion 31 of load change-over valve 3 being suitably connected to railway car underframing contains the pipe and conduit connections from the change-over valve 3 to the various fluid pressure brake equipment. Brake pipe 4 is connected via control valve 1, which filters the pressurized brake fluid, to a conduit 114 which is connected to a passageway 115 in pipe bracket portion 31. Bracket portion 31 has a branch passageway 116 which communicates with chamber 57 in change-over valve portion 32 such that the pressurized fluid from brake pipe 4 reacts on diaphragm 53 to move the piston head 54 and stem 62 rightward as viewed in FIG. 1. In such rightward position of diaphragm 53, which movement similarly positions piston head 54 and stem 62, passageway 115 communicates with groove 49 in stem 47 which connects pressurized fluid from passageway 115 to a passageway 117 which is connected to conduit 27 which directs pressurized fluid into chamber 25 of load measuring mechanism 5 which, in turn, reacts on control piston 20. Upward linear movement of control piston 20 extends piston rod 21 and stop member 23 until stop member 23 engages stop support member 17 which, during an empty condition of a railway car, limits the movement of piston 20 since the relative distance between the stop member 23 and stop member 17 is relatively small so that pressurized fluid in chamber 25 is blocked from passage into passageway 29.

Upon a brake application, supply pipe 8 connects pressurized fluid from the air reservoir 7 via AB valve 1 to a passageway 118 in pipe bracket portion 31, which passageway 118 is connected to a groove 63 in the stem 62. Passageway 118 has a branch passageway 119 connected to the second outer chamber 95, such that pressurization of such chamber 95 moves diaphragm type piston 76 leftward (as viewed in FIG. 1) to cause the end portion of stem 82 to displace valve 100 from sealing bead 75 to open communication between enlarged bore portion 72 and reduced bore portion 71, for a purpose as will become more apparent from the description to follow. Since the pressurized fluid is supplied from the air reservoir 7 under control of the valve 1 into supply pipe 8, and the various passageways in the change-over valve 3 are of very limited volume, displacement volume reservoir 10 is connected into supply pipe 8 to provide additional volume for stability of operation.

Pressurized fluid from air reservoirs 6 and 7 is conducted via conduit 9 to a passageway 120 in change-over valve device 3, which passageway 120 is connected to a normally closed spring-biased valve member 121 and via a branch passageway 122 to the enlarged bore portion 72. Unseating of valve 100 from sealing bead 75 connects branch passageway 122 via bore 72 to reduced bore portion 71. A plurality of ports 123 connect reduced bore portion 71 to an annular chamber 124 which is connected via a passageway 125 to conduit 15 for directing pressurized fluid to the brake cylinders 14 for a braking application. Passageway 125 is connected via a choke 126 to the first outer chamber 94 in relay valve portion 33 which reacts on follower disc 77 and diaphragm 79 of diaphragm type piston 76, which area of application is greater than that piston area acted upon by pressurized fluid in chamber 95, which thereby moves diaphragm type piston 76 rightward. The choke 126 from passageway 125 to the first outer chamber 94 assures the charging of the brake cylinders 14 for a braking application to avoid a premature closing off of the flow of pressurized fluid from enlarged bore 72 to reduced bore portion 71 by restricting the rate of flow to chamber 94 while allowing an unrestricted flow to the brake cylinders 14.

Annular chamber 124 is connected via a branch passageway 127 to the rearward portion of the bore in the cap member 70 to pressurize such portion upon pressurization of annular chamber 124 and thereby bias piston valve device 98 rightward as viewed in FIG. 2. Such biasing action balances the force of fluid pressure in bore 72 acting on piston valve 98 and thus unloads the valve 100.

When a railway car is loaded, the distance between stop member 23 and stop member 17 is such that upon pressurization of chamber 25, via conduit 27, passageways 117 and 115, conduit 114, from brake pipe 4, control piston 20 moves upwardly in strut cylinder 19 to connect pressurized fluid from chamber 25 to passageway 29 and into conduit 30 which is connected to a passageway 128 in change-over valve device 3, which, in turn, is connected to the bore 46 in the central body portion 35 to the respective adjacent reduced end portions of stem 62 and 47, which, in turn, communicates the pressurized fluid via a pair of spaced ports 129 and 130 through an annular chamber 131 and a passageway 132 in change-over valve portion 32 to chamber 42 to move diaphragms 38, 53, piston heads 39, 54, and stems 47 and 62 leftward as viewed in FIG. 1, since the greater area of piston head 39 and diaphragm 38 over diaphragm 53 and piston head 54 provides a differential force which moves the pistons and diaphragms leftward until spring 60 is sufficiently compressed to balance the differential pressure developed. In this position of stems 62 and 47, fluid from brake pipe 4 flows via conduit 114, passageway 115, through port 130 into passageway 132 and chamber 42 to maintain the stems 62 and 47 in their selected positions. Under such positioning of the stems 62 and 47 (as shown in FIG. 4), chamber 25 in strut cylinder 19 is vented to atmosphere via conduit 27, passageway 117, groove 50 in stem 47, chamber 41 and port 45, such that the piston 20 and stop member 23 return downwardly to their lowermost position, thus in effect locking out the load measuring mechanism 5.

Upon a reduction of brake pipe pressure incident to initiating a braking application, control valve 1 operates to supply fluid under pressure via supply pipe 8 to passageway 118 and branch passageway 119. That portion of fluid flowing into branch passageway 119 flows into chamber 95, while that portion of the fluid flowing in passageway 118 flows via groove 63 in stem 62 to a passageway 133 in change-over valve portion 32, pipe bracket portion 31 and relay valve portion 33 to the intermediate chamber 96 to augment the force developed in chamber 95 such as to move diaphragm type piston 76 leftward as viewed in FIG. 1 displacing valve 100, thereby opening communication between bore 72 in relay valve portion 33, with passageway 125 directing pressurized fluid via conduit 15 to brake cylinders 14 as well as chamber 94 in relay valve 33, until the pressure developed in chamber 94 equalizes the unbalanced force developed in chambers 95 and 96, which force requires a full development of pressure in chamber 94 as well as passageway 125 for the brake cylinders 14 such that full braking force available is developed for the loaded railway car as compared to the partially developed braking force for an empty car.

Passageway 115 in the change-over valve 3 has a branch passageway 134 terminating into a chamber 135, which chamber 135 maintains a pressure on the spring-biased valve member 121, such that brake pipe pressure in charging the air reservoirs 6 and 7 will compress the spring below the spring-biased valve member 121 to direct pressurized fluid from passageway 134 and chamber 135 via passageway 120 to conduit 9 which decreases the length of time necessary to charge the air reservoirs 6 and 7 to their maximum pressures. Such action facilitates a quick recovery after a braking application.

Air reservoir 7 is of the conventional type having an auxiliary portion 136 and an emergency portion 137, which emergency portion 137 is connected by conduits to the air supply reservoir 6 which is essentially an auxiliary reservoir to assure sufficient capacity.

Assuming that the ratio of areas of diaphragm 79 (disc 77) versus diaphragm 81 (disc 78) is 5 to 3, then a pressure of fifty (50) p.s.i. developed in chamber 95 during an empty railway car brake application will be balanced by a pressure of thirty (30) p.s.i. developed in chamber 94, such that the passageway 125 which directs the pressurized fluid to chamber 94 as well as brake cylinders 14 will deliver pressurized fluid at thirty (30) p.s.i. to the brake cylinder for a braking application. At such a pressure, the braking application will be less than a full braking application, however, since the railway car is empty, the application will be sufficient to facilitate a stopping of the car without sliding of the wheels. During a braking application on a loaded railway car, the ratio of areas will be one to one since the area of diaphragm 81 is aided by the difference in area of diaphragm 79 and diaphragm 81, such that a pressure of fifty (50) p.s.i. developed in chambers 95 and 96 will be balanced by a pressure of fifty (50) p.s.i. in chamber 94 so that a maximum application of pressure is developed in the brake cylinders 14 to provide for a maximum braking application in a loaded railway car.

In operation of the change-over valve device 3 shown in FIGS. 1 and 2, assume initially that the brake pipe 4 is charged to its normal charge value, say seventy (70) p.s.i., by supply of fluid under pressure to the brake pipe 4 in the well-known manner, and that brake control valve 1 responds to charging of the brake pipe 4 to charge air reservoirs 6 and 7. Supply pipe 8 is connected by control valve 1 to atmosphere via a release pipe, thereby connecting chamber 95 via passageways 119 and 118 to supply pipe 8 and to atmosphere. Assuming also that the railway car is empty and that, therefore, upon charging of the brake pipe 4, pressurized fluid is directed via control valve 1 into conduit 114, to passageways 115 and to the load measuring mechanism 5 via passageway 117, conduit 27, however, since the railway car is empty and the car springs are compressed only slightly, the pressurization of chamber 25 in strut cylinder 19 extends stop member 23 only a relatively short distance before it engages stop member 17, thereby blocking communication between passageways 29 and 26.

Under the assumed conditions, pressurized fluid from the brake pipe 4, in addition, flows via conduit 114, passageway 115 and branch passageway 116 to chamber 57 to exert a force on diaphragm 53, thereby moving diaphragm 53, piston head 54 and stem 62 rightward along with stem 47, piston head 39 and diaphragm 38. FIG. 3 discloses the position assumed by such stems 62 and 47. Chamber 25 in strut cylinder 19 is vented to atmosphere via conduit 27, passageway 117, groove 49, chamber 41 and port 45, such that the piston 20 along with stop member 23 returns to their downward position disengaged from stop member 17.

When brake pipe pressure is reduced under operator control in the usual manner for causing a brake application, control valve 1 operates to supply fluid from air reservoirs 6 and 7 to supply pipe 8 which flows via passageway 118 to branch passageway 119 to second outer chamber 95, whereby diaphragm type piston 76 moves leftward such that stem 82 unseats valve 100 to conduct pressurized fluid from the reservoirs 6 and 7 via conduit 9 to passageway 120 to branch passageway 122 to the enlarged end bore portion 72, and thence via reduced bore portion 71, via passageway 125 and conduit 15 to the brake cylinders 14, while simultaneously flowing through choke 126 from passageway 125 to the first outer chamber 94. When the fluid pressure in chamber 94 acting over the effective area of diaphragm 79 and follower disc 77 is sufficient to overcome the force acting on diaphragm 81 and follower disc 80, diaphragm type piston 76 moves rightward allowing biased valve 100 to seat on sealing bead 75 so that the fluid under pressure will be locked in the brake cylinders 14 for a braking application. Upon a further reduction in brake pipe pressure, fluid from air reservoirs 6 and 7 flows via supply pipe 8 through passageways 118 and 119 to outer chamber 95 to increase the pressure therein and cause diaphragm type piston 76 to move leftward and effect a consequent increased force to unseat valve 100, and fluid under pressure from reservoirs 6 and 7 flows via conduit 9, passageways 120 and 122, bores 72 and 71, passageway 125 to the brake cylinders 14 for an increase in brake application, and via choke 126 to outer chamber 94 until the increased pressure in outer chamber 94 develops sufficient differential force on diaphragm 79 and follower disc 77 to move the diaphragm type piston 76 rightward to seat valve 100 on sealing bead 75 and thereby terminate a further increase in brake pressure.

When the pressure in the brake pipe 4 is increased to thereby release the brakes, the supply pipe 8 via control valve 1 is connected to atmosphere, thereby connecting outer chamber 95 via passageways 119, 118 to supply pipe 8 for venting outer chamber 95 to atmosphere and consequently moving diaphragm piston 76 rightward until follower disc 80 engages cap member 69. Such action connects the brake cylinders 14 via conduit 15 to passageway 125 which is connected via annular chamber 124 and ports 123 to bore 71, and thence to bore 88 in stem 82 and via port 89 in stem 82 to groove 87, thence into annular chamber 90 which vents to atmosphere via port 91.

Under such control of the control valve 1, load indicating chamber 110 is connected via passageway 113 at all times to groove 64 in stem 62, which, via chamber 56, is vented to atmosphere at all times thereby maintaining the diaphragm type piston 105 seated on the bottom surface 102 of recess 101, which maintains guide stem 111 within casing 103 thereby visually indicating an unloaded or empty condition of the railway car.

Assuming that the brake pipe has been vented below 8-10 p.s.i. or to atmosphere for an emergency application of the brakes such that fluid pressure in conduit 114, passageways 115, 116 as well as chamber 57 will be vented to atmosphere, thereby subjecting stems 62 and 47, piston heads 54 and 39 only to the forces of springs 60 and 44 which thereby centers the stems 62 and 47 into neutral. Recharging of the brake pipe under these conditions causes the load measuring mechanism 5 to check the load or empty condition of the railway car and thereby conditions the change-over valve in the manner to be described. It should be noted that the load measuring mechanism 5 is actuated to register a loaded or empty condition of a railway car whenever an emergency brake pipe reduction has been effected, such that the stems 62 and 47 return to neutral and are in condition for directing fluid to the load measuring mechanism 5. Assuming a neutral position of the stems 62 and 47 and a loaded condition of the railway car, the position of the strut cylinder 19 relative to the sprung portion 18 of the car is such as is shown in FIG. 1, wherein the stop member 23 on the movable piston rod 21 is in such a position that upward movement of the stop member 23, relative to the stop member 17, is such as to uncover passageway 29 to the chamber 25 and communicate the respective passageways 26 and 29. Pressurized fluid from brake pipe 4 flows via conduit 114, passageway 115 into groove 49 on stem 47, and then into passageway 117 to conduit 27 and thence via passageway 26 into chamber 25 which is in communication with passageway 29, thence via passageway 29 into conduit 30 and thence into passageway 128 and thence to the clearance space between the outer most reduced end portion of stem 47 and the bore 46, and thence via ports 129 and 130 to the annular groove 131, and thence via passageway 132 to chamber 42. Since chamber 57 is similarly pressurized to the brake pipe pressure via passageway 116, passageway 115, conduit 114 and brake pipe 4, the differential force developed, since diaphragm 38 and piston head 39 are larger in cross-sectional area than the diaphragm 53 and piston head 54, moves the respective stems 47 and 62 and diaphragms leftward as viewed in FIG. 2, to thereby register groove 49 on stem 47 with the respective passageways 115 and 132 via ports 130 and annular groove 131, which action conducts pressurized fluid from the brake pipe 4 via conduit 114 and passageway 115, groove 49 in stem 47, via port 130 and passageway 132 to chamber 42 on the rightward portion of the change-over valve 3 to maintain diaphragm 38 and piston head 39, stem 47 as well as stem 62, piston head 54 and diaphragm 53 in the newly registered position. As previously mentioned, such action vents chamber 25 in strut cylinder 19 to atmosphere since conduit 27, passageway 117, groove 50 are connected to chamber 41 and port 45 to atmosphere, thereby locking out the load measuring device 5 until the brake pipe pressure is reduced to atmosphere which vents chamber 57 and chamber 42. Thus springs 60 and 44 center stems 47 and 62 for a further load measurement by the load measuring mechanism 5 whenever pressurized fluid is introduced into the brake pipe 4 such that the load measuring mechanism 5 positions stems 47 and 62 into a load or empty position as discussed above.

While the railway vehicle is in the loaded car condition and the brake pipe pressure is reduced under operator control in the usual manner for causing a brake application, control valve 1 operates to supply fluid from air reservoirs 6 and 7 to the brake cylinders 14 via supply pipe 8, passageway 118, thence via branch passageway 119 to the outer chamber 95, whereby diaphragm type piston 76 moves leftward. In addition to such action, pressurized fluid via supply pipe 8 and passageway 118 flows via groove 63 in stem 62 to passageway 133 and thence to intermediate chamber 96 to augment the force developed by the pressure fluid in chamber 95, wherein such action moves diaphragm type piston 76 leftward such that the stem 82 unseats the valve 100 to conduct pressurized fluid from the reservoirs 6 and 7 via conduit 9 to passageway 120 and thence via passageway 122 to the enlarged end bore portion 72, and thence via reduced bore portion 71 to passageway 125 to the brake cylinders 14 while simultaneously flowing through choke 126 to the outer chamber 94. When the fluid pressure in chamber 94 is sufficient to overcome the fluid pressure in chambers 95 and 96 when acting over the net differential areas of diaphragms 79 and 81, an equalization of net differential forces develops to seat valve 100 and effect a full braking application in the brake cylinders 14. A one to one braking ratio application is provided since the area of diaphragm 81 is aided by the difference in area of diaphragm 79 and diaphragm 81, such that a pressure of fifty (50) p.s.i. developed in chambers 95 and 96 will be balanced by the pressure of fifty (50) p.s.i. in chamber 94 so that a maximum application of pressure is developed in the brake cylinders 14 to effect a maximum braking application for a loaded railway car.

FIG. 3 of the drawings discloses a modified brake control system wherein similar elements such as the brake control valve 1, brake pipe 4, reservoir 7 and the load measuring device 5 retain the same numerals and operate in the same manner as discussed above. The load measuring device 5 is similar in all respects to the previously discussed device 5 in the embodiment of FIGS. 1 and 2, except that the load measuring device 5 has the strut cylinder 19 inverted, however, being mounted on the sprung portion of the railway car with the stop member 17 mounted on an unsprung portion 138 of the railway car for engagement by the stop member 23.

The brake controlling valve device 1 may be of any well-known type, such as the AB valve, comprising valve means responsive to a service rate of reduction in pressure of fluid in a brake pipe 4 below a normal charge value to supply fluid under pressure from an auxiliary reservoir 136 to a pipe 139 for causing a service application of brakes, and responsive to an emergency rate of reduction in brake pipe pressure to supply fluid under pressure from the auxiliary reservoir 136 and also from an emergency reservoir 137 to pipe 139 for causing an emergency application of brakes, and responsive to an increase in brake pipe pressure following either a service or emergency application of brakes, to release fluid under pressure from pipe 139 for causing a release of brakes and also connect the brake pipe 4 to the auxiliary reservoir 136 and emergency reservoir 137 for recharging said reservoirs to equal pressure with brake pipe pressure, as is well understood in the art. This is similar to the operation of the first disclosed embodiment.

In addition to the control valve 1, load measuring device 5 and air reservoir 7, the fluid pressure brake equipment includes a brake cylinder device 140 and a load change-over valve device 141.

The brake cylinder device 140 comprises a casing containing a piston 142 slidably mounted therein. Piston 142 cooperates with the casing to define a pressure chamber 143 at the one end thereof. The pipe 139 from control valve 1 has a connection to chamber 143 for pressurization thereof to move the piston 142 in a leftward direction as viewed in FIG. 5 for applying the brakes. Pipe 139, in addition to being connected to chamber 143, is connected to a passageway 144 in change-over valve device 141 to be described. Upon release of fluid under pressure from chamber 143 by way of pipe 139, a return spring 145 is adapted to move piston 142 in a rightward direction as viewed in FIG. 5 to a brake release position in which it is shown on the drawing. A cylinder 146 encircling the release spring 145 and attached at one end to piston 142 is slidably mounted adjacent its opposite end in the casing. Cylinder 146 cooperates with the piston 142 and the casing to provide an annular load compensating chamber 147 around the cylinder 146 for receiving fluid under pressure from a passageway 148 in the change-over valve device 141 to oppose pressure of fluid in chamber 143 acting on piston 142. As will later be described in detail, when a vehicle is fully loaded, the chamber 147 will be vented in order that the brakes on the vehicle will be applied to a degree governed by the full pressure of fluid in chamber 143 acting on piston 142. With a vehicle empty, a certain maximum pressure of fluid will be provided in chamber 147, whereby the degree of braking of the empty vehicle will be limited to the differential and the opposing forces thus provided on piston 142.

The load change-over valve device 141 comprises a sectionalized casing having a central body portion 149 and a pair of spaced end sections 150 and 151, which end sections 150 and 151 have cup-shaped cylindrical recesses 152 and 153, respectively. Recesses 152 and 153 have their longitudinal center line coincident with a longitudinal center line of a bore 154, which bore 154 extends through the central body portion 149. A movable diaphragm 155 suitably located between one end section 151 and the central body section 149 has its outer peripheral edge clamped between the central body portion 149 and the one end section 151. A piston head 156 located in the one end of central body section 149 adjacent end section 151 is suitably secured to one end of diaphragm 155 for movement therewith. A circular follower disc 157 located in end section 151 abuttingly engages the other end of diaphragm 155. Diaphragm 155 cooperates with the central body portion 149 to define a chamber 158 therein, and cooperates with the end section 151 to define a chamber 159. The end section 151 closely adjacent the central body portion 149 is internally annularly recessed to receive an annular stop ring 160 which limits the movement of follower disc 157 into the central portion of body portion 149. Follower disc 157 is suitably recessed as at 161 along its outer periphery to provide communication between all portions of chamber 159. A spring 162 located in chamber 159 has one end seated on the closed end portion of end section 151 and its other end abuttingly engaging follower disc 157, thereby biasing follower disc 157 into engagement with the stop ring 160 and diaphragm 155. The central body section 149 has a port 163 connecting chamber 158 with atmosphere for maintaining chamber 158 at atmospheric pressure at all times. The central bore 154 in central body section 149 connects chamber 158 at one end thereof with a chamber 164 at the other end portion of body section 149. Reciprocably mounted in the bore 154 of body section 149 is a stem 165 of piston head 156, which stem 165 has a pair of spaced grooves 167 and 168 to define a pair of spaced lands 169 and 170, which lands slidingly and sealingly contact the inner wall surface of bore 154.

A movable diaphragm 171 suitably located between the end section 150 and the central body section 149 has its peripheral edge clamped between the central body portion 149 and the end section 150. A piston head 172 located in the other end of central body section 149 adjacent end section 150 is suitably secured to one end of diaphragm 171 for movement therewith. A circular flat follower disc 173 located in end section 150 is adapted to abuttingly engage the other end of diaphragm 171. Diaphragm 171 cooperates with the central body section 149 to define the chamber 164, and cooperates with the other end section 150 to define a chamber 174. The other end section 150 closely adjacent the central body portion 149 is internally annularly recessed to receive an annular stop ring 175 which limits the movement of follower disc 173 towards the central body portion 149. Follower disc 173 is recessed at its outer periphery as at 176 to maintain fluid communications between all portions of chamber 174 when disc 173 abuttingly engages stop ring 175.

A spring 177 located in chamber 174 has one end seated on the closed end portion of end section 150 and its other end abuttingly engaging follower disc 173 for biasing follower disc 173 into engagement with the stop ring 175 and the diaphragm 171. The central body portion 149 has a port 178 connecting chamber 164 with atmosphere. The piston head 172 has a stem 179 extending into the bore 154 of the central body portion 149 with its reduced end portion abuttingly engaging the reduced end portion 166 of stem 165. Stem 179 has a pair of spaced grooves 180 and 181 defining a pair of spaced lands 182 and 183 which slidingly and sealingly contact the inner wall surface of bore 154.

Brake pipe 4 is connected via control valve 1 to a conduit 184 which conducts strained pressurized fluid to a passageway 185 in the change-over valve device 141, which passageway 185 communicates with the groove 167 in stem 165, which groove 167 registers with a passageway 186, which passageway 186 is connected to a conduit 187 which is connected to the passageway 26 in the load measuring mechanism 5 for communication with the chamber 25 to pressurize load measuring device 5. In the loaded condition of a railroad car stop member 23 on the lower end of piston 21 which extends from strut cylinder 19 mounted on the sprung portion of the railway car is relatively close to the stop member 17 such that pressurization of chamber 25 in load measuring device 5 moves piston 20 downwardly a relatively short distance when stop member 23 engages the stop support member 17 thereby preventing communication between the respective passageways 26 and 29. Passageway 29 in load measuring device 5 is connected via a conduit 188 to a passageway 189 in change-over valve device 141, which passageway 189 is connected to the clearance space between the respective reduced end portions of stems 165 and 179, which clearance space registers with a passageway 190 which is connected to the chamber 159 on the right-hand portion of the change-over valve device 141. Passageway 185 has a branch passageway 191 which is connected to the chamber 174 located at the left-hand portion of the change-over valve device 141 as viewed in FIG. 3.

The upper end portion of change-over valve device 141 has a pair of chambers 192 and 193 which are connected via passageways 194 and 195 respectively to the respective end portions of the central bore 154 of body portion 149 similar to the load indicating devices 34 in the first embodiment. Such load indicating devices are not shown in FIG. 5 since the indicating mechanism may be readily attached to the compensating brake cylinder 140 to provide a piston reactive chamber connected to chamber 147 such that pressurization of chamber 147 will also pressurize the piston reactive chamber and extend a piston located therein to have the stem portion thereof exposed and indicating an unloaded condition of the railway car and braking apparatus.

In operation of the change-over valve device 141 shown in FIG. 5, assume initially that the brake pipe 4 has been charged to its normal charge value under control by supply of fluid under pressure to the brake pipe 4 in the well-known manner, and that brake control valve 1 has responded to charging of the brake pipe 4 to charge air reservoir 7 with fluid at the pressure of fluid in the brake pipe 4 while simultaneously strained air flows through control valve 1, passageway 184 into the change-over valve device 141, thence via passageway 185, groove 167 to a passageway 186, thence via conduit 187 to the load measuring mechanism 5. A branch passageway 191 in change-over valve device 141 connects pressurized fluid from passageway 185 to chamber 174, the left-hand portion of the change-over valve device 141, whereby pressurization in chamber 174 exerts a force on diaphragm 171 and piston head 172 to move the diaphragm and piston head rightward as viewed in FIG. 5 to condition the change-over valve device 141 for operation. The brake cylinder pressure chamber 143 is connected via passageway 139 to control valve 1 which, in turn, connects passageway 139 to atmosphere via the release pipe. In addition, chamber 159 is connected to atmosphere via passageway 190 which is connected to the clearance space between the reduced end portions of stem 165 and 179 and the bore 154 of the central body section 149, thence via passageway 189 to a conduit 188 which is connected to chamber 28 in the load measuring mechanism 5 which is connected via passageway 22 to atmosphere. In assuming that the railway car is loaded, pressurized fluid in chamber 25 will exert a downward force on piston 20, thereby moving piston 20 and stem 21 downwardly relative to the stop member 17. Stop member 23 will move downwardly until it engages the stop member 17, whereby communication is blocked between the passageways 26 and 29, thereby preventing the flow of pressurized fluid from conduit 187 to conduit 188.

Under the assumed conditions, pressurized fluid from the brake pipe 4 flows via passageway 184, passageway 185 and branch passageway 191 to chamber 174 to exert a force on diaphragm 171, thereby moving diaphragm 171, piston head 172 and stem 179 rightward along with stem 165, piston head 156 and diaphragm 155. Such action positions the stems 165 and 179 which vents chamber 25 of the strut cylinder 19 via conduit 187, passageway 186, groove 167, chamber 158 and port 163 to atmosphere, thus locking out the load measuring mechanism 5.

When brake pipe pressure is reduced under operator control in the usual manner for causing a brake application, control valve 1 operates to supply fluid from air reservoir 7 to brake cylinder supply pipe 139 into pressure chamber 143 to thereby move piston 142 leftward as viewed in FIG. 3 for a braking application. Under this fully loaded vehicle condition, the vehicle brakes will therefore be applied with a force equal only to the pressure of fluid in the brake cylinder pressure chamber 143 acting on piston 142. When it is desired to release the brakes on the vehicle, fluid under pressure will be built up in the brake pipe 4 and pressurized fluid in passageway 139 will be vented to atmosphere, thereby venting pressure chamber 143, and return spring 145 will return the piston 142 to its brake release position in which it is shown in the drawing.

Assuming that the load on the car has been removed and that the change-over valve 3 is thereby repositioned into neutral by prior reduction in brake pipe pressure, wherein the brake pipe has been vented to atmosphere such that stems 179 and 165 are positioned into neutral in the same manner as discussed in the previous embodiment. In such condition of stems 179 and 165, pressurized fluid flows via brake pipe 4 through control valve 1, thence via conduit 184 to passageway 185 in the change-over valve device 141, into passageway 186, thence via conduit 187 to the pressure chamber 25 of load measuring device 5 whereby the pressurized fluid exerts a downward force on the piston 20 moving stop member 23 downward until it engages the stop member 17, which is the position shown in full lines in FIG. 5, such that communication is established between passageways 26 and 29 so that pressurized fluid flows via conduit 187 through pressure chamber 25 to conduit 188, thence via passageway 189 to change-over valve device 141, into passageway 190 to pressure chamber 159 to exert a force on diaphragm 155 to move diaphragm 155, stem 165, stem 179 and diaphragm 171 leftward as viewed in FIG. 5, since the force developed in chamber 159 is greater than the force developed in chamber 174 due to the difference in the respective areas of the diaphragms. Such action registers groove 167 of stem 165 with passageways 185 and 190 such that pressurized fluid in passageway 185 flows via passageway 190 into chamber 159 to maintain the force on piston head 156 and diaphragm 155 to maintain stems 165 and 179 in their newly registered position. Such action vents chamber 25 of strut cylinder 19 via conduit 187, passageway 186, groove 168, chamber 158 and port 163 to atmosphere, thus locking out the load measuring mechanism 5.

When it is desired to effect an application of the brakes, the brake pipe pressure will be reduced in the usual manner, causing the brake control valve device 1 to supply fluid under pressure from the auxiliary reservoir 137 or both reservoirs 136 and 137 under an emergency application, such that fluid under pressure will be supplied through control valve 1 via supply pipe 139 to passageway 144 in change-over valve device 141 which supplies pressurized fluid to the pressure chamber 143 in brake cylinder device 140, while simultaneously fluid will flow via passageway 144 and groove 180 in stem 179, thence via passageway 148 to the load compensating chamber 147 in brake cylinder device 140. With the same fluid pressure in main pressure chamber 143 and in compensating chamber 147 of the brake cylinder device 140, the brakes on the empty vehicle, for a given reduction in pressure of fluid in the brake pipe 4, will effect a limited braking action due to the differential forces developed by the substantially equal pressures in chambers 143 and 147 acting on the different opposing effective areas of the brake cylinder piston 142.

When it is desired to effect a release of the brakes, the brake pipe pressure will be increased in the usual manner causing the brake controlling valve device 1 to establish communication from the brake pipe 4 to charge the respective reservoirs 136 and 137 while establishing communication from the supply pipe 139 which is connected to the respective chambers 143 and 147 to atmosphere, thus venting main pressure chamber 143 and compensating chamber 147 to pipe 139 via the release pipe in the control device 1.

Having now described the invention, what I claim as new and desire to secure by Letters Patent, is:

1. In a vehicle brake apparatus, in combination:
   (a) a change-over valve device for automatically controlling the degree of a brake application according to a variable operating condition of the vehicle, said device comprising:
      (i) a casing,
      (ii) a double-acting piston member of different effective areas on opposite ends thereof shiftable oppositely in said casing when subjected selectively to fluid pressure on one end only or on both said one and the other of said ends simultaneously,
      (iii) valve means operative by said piston member to one position when said piston member is subjected to fluid pressure on said one end only and operative to a second position when said piston member is subjected to fluid pressure on both ends simultaneously,
      (iv) means biasing said valve means to a neutral zone when said piston member is not subjected to fluid pressure at either end,
      (v) fluid pressure communication means cooperative with said valve means in said one position to supply fluid under pressure for conditioning the brake apparatus to effect a certain degree of brake application, and cooperative with said valve means in said second position to supply fluid under pressure for conditioning the brake apparatus to effect a brake application different in degree than said certain degree,
   (b) means operatively responsive to fluid pressure for registering a variable operating condition of the vehicle and correspondingly operable under one of said variable conditions for supplying fluid under pressure to said other end portion of said piston member for actuating said piston member into said second position,
   (c) said valve means being effective only in its neutral zone to establish communication via which fluid pressure is supplied to the last said means, and
   (d) said valve means being effective in its said one or said second position to establish communication via which fluid under pressure is released from the said last-mentioned means to render it non-operative to register the variable operating condition of the vehicle.

2. In a vehicle brake apparatus, in combination:
   (a) a brake pipe charged with fluid at a certain normal pressure to effect a brake release, reduction of said normal pressure being effective to initiate a brake application on the vehicle,
   (b) a double-acting differential area fluid pressure operated change-over valve device selectively operative from a neutral zone to either of two different positions on opposite sides of its neutral zone to vary the degree of a brake application effected responsively to a given reduction of the pressure in the brake pipe from its normal pressure, and
   (c) means for selectively subjecting said differential area valve device to pressure of fluid in the brake pipe acting in one direction only or simultaneously in opposite directions depending upon the load on the vehicle, thereby to cause said valve device to be shifted to one or the other of the said two positions on opposite sides of its neutral zone.

3. In a vehicle brake apparatus operative upon a reduction in brake pipe pressure to effect a braking application, in combination:
   (a) a change-over valve device having a differential piston valve means,
   (b) said differential piston valve means being selectively operable between a first and second position from a neutral position,
   (c) means for selectively positioning said differential piston means, wherein said means includes:
      (i) a load measuring device actuable by fluid pressure supplied through said valve means in neutral position to register a loaded or empty condition of a railway vehicle,
      (ii) locking means for securing said differential piston means in said first or second position after registration of said load measuring device,
      (iii) valve means for de-actuating said load measuring device upon operation of said locking means, and
   (d) said differential piston valve means being operative in said first and second position to condition brake control means for different degrees of brake application respectively with the same amount of reduction in brake pipe pressure.

4. In a vehicle brake apparatus, a change-over valve device for regulating the brake applying force in accordance with the load condition of the vehicle, said device comprising:
   (a) a casing,
   (b) a piston member reciprocably mounted therein,
   (c) said piston member having one end portion of a smaller effective area than its other end portion,
   (d) valve means operatively connected to said piston member for movement therewith,
   (e) means biasing said piston members and said valve means into a neutral zone,
   (f) a fluid pressure operated load measuring device,
   (g) means communicating pressure from a pressure source to said one end portion of said piston member for biasing said piston member and said valve means into a first position,
   (h) said valve means being effective in the said neutral zone for effecting a connection between said communicating means and said load measuring device for actuation thereof to register a loaded or empty condition of a railway vehicle, and
   (i) said load measuring device being operatively responsive to one of such conditions to communicate fluid pressure from the pressure source to said other end portion for biasing said piston member and said valve means into a second position.

5. In a vehicle brake apparatus, as set forth in claim 4, wherein said change-over valve device is further characterized in that:
   (a) said valve means is operative in said first and second position to interrupt the connection between said communicating means and said load measuring device and to establish communication via which fluid pressure is vented from said load measuring device to render it non-load-measuring.

6. In a vehicle brake apparatus, as set forth in claim 5, the combination further characterized by:
   (a) a brake pipe charged to a certain normal pressure to effect brake release and reduction from which pressure initiates a brake application, (b) said brake pipe being such pressure source, and (c) means causing said piston member to be self-locking in said first and second position as long as brake pipe pressure exceeds a certain low pressure.

7. In a vehicle brake apparatus, as set forth in claim 6, wherein said change-over valve device further includes:

(a) a relay portion having:
  (i) a normaly seated valve member,
  (ii) a valve seat member cooperative with said valve member whereby the unseating of said valve member therefrom effects the supply of brake applying pressure,
  (iii) two opposed fluid pressure responsive diaphram means operatively connected to said valve member for controlling the movement of said valve member relative to said valve seat member,
  (iv) one of said diaphragm means having a larger effective area than the other of said diaphragm means,
  (v) the other of said diaphragm means being cooperative with said valve means in its said first position during a reduction in brake pipe pressure for connection to a pressure source for actuation thereof to unseat said valve member, and
  (vi) conduit means operative upon unseating of said valve member for connecting pressurized fluid to brake applying means while simultaneously connecting fluid to said diaphragm means of larger area for balancing said diaphragm means of lesser area to seat said valve member thereby regulating the pressurized fluid delivered for applying brakes.

8. In a vehicle brake apparatus, as set forth in claim 7, the combination wherein said relay portion has means operatively connected to said diaphragm means for balancing said diaphragm means at equal pressures.

9. In a vehicle brake apparatus, as set forth in claim 7, the combination wherein:

(a) said other diaphragm means is cooperative with said valve means in its said second position during a brake pipe reduction for connection to a pressure source for actuation thereof simultaneously with the connection of said one diaphragm means to said last-mentioned pressure source for actuation thereof to unseat said valve member, and (b) said conduit means is operative upon unseating of said valve member for connecting pressurized fluid to said one diaphragm means for balancing said one diaphragm means and said other diphragm means to seat said valve member thereby regulating the pressurized fluid delivered for applying brakes.

10. In a vehicle fluid pressure brake apparatus, the combination of:

(a) a brake pipe charged to a certain normal pressure to effect brake release and reduction from which pressure initiates a brake application, (b) a brake cylinder means subject to being pressurized to effect a braking application, (c) a change-over valve device having a movable member therein, (d) said movable member having a pair of spaced end portions wherein one end portion is of smaller area than the other end portion, (e) said movable member operative from a neutral position to a first and second position, (f) a load measuring device operative upon actuation to register a loaded or an empty condition of a railway car, (g) means communicating pressurized fluid from said brake pipe to one end portion of said movable member for moving said movable member into a first position, (h) said movable member operative in neutral position to communicate said load measuring device to said connecting means for actuation thereof, (i) said load measuring device operative in one of said conditions to communicate pressurized fluid from the brake pipe to the other end portion of said movable member for moving said movable member into said second position, (j) said movable member operative in said first and second position to communicate said one end portion or said one end portion and said other end portion respectively to said connecting means while simultaneously communicating said load measuring device to atmosphere to vent fluid under pressure therefrom, and (k) pressure regulating means responsive upon reduction from the normal pressure in said brake pipe for supplying fluid to said brake cylinder means in a greater or lesser degree in accordance with the position of said movable member.

11. In a vehicle fluid pressure brake apparatus, the combination as set forth in claim 10, wherein said pressure regulating means comprises:

(a) a relay valve portion, said relay valve portion having a valve member and a valve seat member, (b) said valve member and said valve seat member cooperating to control the supply of the brake applying pressure to said brake cylinder means to different pressures, (c) a differential piston reciprocably mounted in said relay valve portion having a projection for unseating said valve member, (d) said differential piston having a pair of spaced fluid pressure responsive diaphragm means for controlling the movement of said valve member with respect to said valve seat member, (e) one of said pair of diaphragm means having a smaller effective area cooperative with said movable member in said first position for communicating with pressurized fluid from a pressure source during a brake pipe pressure reduction to thereby unseat said valve member, (f) said one diaphragm means being subjected to selected pressures established corresponding to a desired degree of reduction in the brake pipe pressure, and (g) the other of said diaphragm means being operative following unseating of said valve member to balance the pressure of said one diaphragm means and thereby reseat said valve member for subjecting said brake cylinder means to a pressure inversely proportional to the ratio of the effective areas of said one diaphragm means and the other of said diaphragm means.

12. In a vehicle brake apparatus, in combination:

(a) a brake pipe charged with fluid at a certain normal pressure to effect a brake release, reduction of said normal pressure being effective to initiate a brake application on the vehicle, (b) a brake cylinder device comprising a differential piston means cooperative with said brake cylinder device to define a main chamber and a compensating chamber, (c) said compensating chamber of said differential piston means being of a smaller effective area than said main chamber for providing one degree of braking or a greater degree of braking as both of said chambers are charged with fluid under pressure or only said main chamber is charged, (d) a double-acting differential area fluid pressure operated change-over valve device selectively subjected to fluid pressure and correspondingly operative from a neutral zone to either of two different positions on opposite sides of its neutral zone to control the degree of brake application effected by said brake cylinder device, (e) said change-over valve device being operative in one of said two different positions to limit the supply of pressurized fluid to said main chamber to thereby cause the brake cylinder device to effect a certain degree of a brake application responsively to a given reduction of pressure in said brake pipe from its normal pressure, (f) said change-over valve device being operative in the other of said two different positions to conduct pressurized fluid from said main chamber to said compensating chamber to thereby cause said brake cylinder device to effect a lesser degree of brake application responsively to said given reduction of pressure in said brake pipe from its normal pressure, and (g) said change-over valve device being operative in either of said two different positions to render said change-over valve device self-locking.

13. In a vehicle brake apparatus, the combination as set forth in claim 12, further characterized by:

(a) means biasing said change-over valve device into a neutral position, (b) a fluid pressure operated load measuring device, (c) said change-over valve device being operative in its neutral position to establish communication via which fluid under pressure is supplied to actuate said load measuring device to register a loaded or empty condition of a railway vehicle, (d) said load measuring device being operative in one of said conditions to direct pressurized fluid to move said change-over valve into one of said two different positions and said load measuring device being inoperative in the other of said conditions, and (e) said change-over valve device being operative in its neutral position to condition said change-over valve for movement to said one position upon failure of said load measuring device to register said one condition.

References Cited in the file of this patent
UNITED STATES PATENTS
2,077,923    Farmer  ---------------- Apr. 30, 1937